United States Patent [19]
Azam et al.

[11] Patent Number: 6,167,260
[45] Date of Patent: *Dec. 26, 2000

[54] METHOD FOR DEMAND CHANNEL CHANGE FOR A RADIO TELEPHONE

[75] Inventors: Zafarul Azam, Barrington; Douglas W. Main, Grayslake, both of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/594,544

[22] Filed: Jan. 31, 1996

[51] Int. Cl.[7] ................................ H04Q 7/20; H04B 7/00
[52] U.S. Cl. ...................... 455/426; 455/454; 455/464; 455/517
[58] Field of Search ..................... 455/550, 426, 455/464, 434, 517, 454, 425, 452, 455, 552, 450; 375/202

[56] References Cited

U.S. PATENT DOCUMENTS

| | | | |
|---|---|---|---|
| 5,408,684 | 4/1995 | Yunoki et al. | 455/434 |
| 5,418,839 | 5/1995 | Knuth et al. | 455/464 |
| 5,463,659 | 10/1995 | Nealon et al. | 375/202 |
| 5,768,345 | 6/1998 | Takebe et al. | 455/464 |
| 5,774,805 | 6/1998 | Zicker | 455/426 |
| 5,794,156 | 8/1998 | Alanara | 455/517 |
| 5,901,357 | 5/1999 | D'Avello et al. | 455/454 |

OTHER PUBLICATIONS

Mouly, Michel and Pautet, Marie–Benadette, "The GSM System for Mobile Communications", 1992, pp. 3237–342.
Motorola, "Secure Clear™ Cordless Telephone Model 550" Owner's Manual, Apr. 2, 1993, pp. 16–17.

*Primary Examiner*—William Cumming
*Attorney, Agent, or Firm*—Randall S. Vaas; Michael C. Soldner

[57] ABSTRACT

A radiotelephone system (100) includes a radiotelephone (102) and a central device (104) that communicate via radio frequency (RF) signals. The radiotelephone (102) includes a user interface (114) which permits the user to request a channel change by the central device. A signal is communicated to the user if a channel change is denied. A channel scan can be conducted by the radiotelephone to identify a new channel.

1 Claim, 4 Drawing Sheets

METHOD FOR DEMAND CHANNEL CHANGE FOR A RADIO TELEPHONE

FIELD OF THE INVENTION

The present invention pertains to channel control.

BACKGROUND OF THE INVENTION

Radiotelephone systems include a radiotelephone, such as a mobile station, operatively coupled to a central device, such as a base station subsystem. The radiotelephone communicates with the central device over signaling channels. A signaling channel in a bi-directional radio frequency (RF) analog system, such as a cellular system, and more particularly an advanced mobile phone system (AMPS) or narrow advanced mobile phone system (NAMPS), is a particular pair of frequency bands. A first, lower, signal bandwidth is used for the transmit path, from the radiotelephone to the base station, and a second, higher, bandwidth is used for the receive path, from the base station to the radiotelephone. The base station manages communication links with radiotelephones within its coverage area, which is commonly known as a cell. This link management includes assigning channels to the radiotelephones and initiating inter base station handoff.

Inter base station handoff in cellular systems is handoff of a radiotelephone communication link from a first base station to second base station. This handoff procedure is initiated by the first base station when the received signal strength indicator (RSSI) measurements for signals received by this base station fall below a desired level. The handoff is accomplished between the first and second base stations according to a known protocol. The handoff protocol that is typically used in analog cellular radiotelephone systems considers the direction of travel of the radiotelephone in the cellular service area. When the signal strength is weak, and the radiotelephone is moving to an edge of a cell, the hand off-is initiated by the first base station. Thus, the handoff is a base station initiated action. However, this protocol does not accommodate inter base station changes, which are changes to other channels of the base station, or take into consideration the signal strength of signals transmitted to the radiotelephone in initiating a channel change, or permit a user to request a channel change.

Some time division multiple access (TDMA) digital cellular system include mobile assisted handoff. In these systems, the radiotelephone periodically measures the signal strength of the radiotelephone receive paths of different channels for use in handoff procedures. The measured signal strength is transmitted to the base station. The base station makes inter base station handoff decisions based in part on these channel measurements received from the radiotelephone. However, the system does not permit the user to request a channel change at any time based upon the user's perceived received signal quality.

In cordless radiotelephones, the user can initiate a channel change for the RF link between a handset and its dedicated base, which base is connected to a land-line telephone system. The channel change is initiated using a key in the handset. When the user actuates the key, a signal is communicated to the base that controls the base to select the next sequential channel that is not in use. Although this system works well for a cordless telephone handset which is dedicated to the base and has a very limited number of possible channels (such as ten channels), channel change requests only result in rotation through each of the channels in a predetermined, fixed sequence.

DETAILED DESCRIPTION OF THE INVENTION

A radiotelephone system 100 (FIG. 1) includes a radiotelephone 102 and a central device 104 that communicate via radio frequency (RF) signals. The radiotelephone 102 includes a user interface 114 (FIG. 2) by which the user requests a channel change from the central device 104. The central device 104 selectively allocates a new channel to the radiotelephone after evaluating other channels in the cell. A signal is communicated to the user if a channel change is denied. A channel scan can be conducted by the radiotelephone to help identify a new channel. The system provides a user initiated channel change that permits the user to request a channel change when the user perceives that received signal quality is poor. In radiotelephone systems having inter sector handoff, the user requested channel change can result in either inter sector handoff or an intra sector channel change. The system and method provides the user with more flexibility in initiating channel changes.

Figure 1:
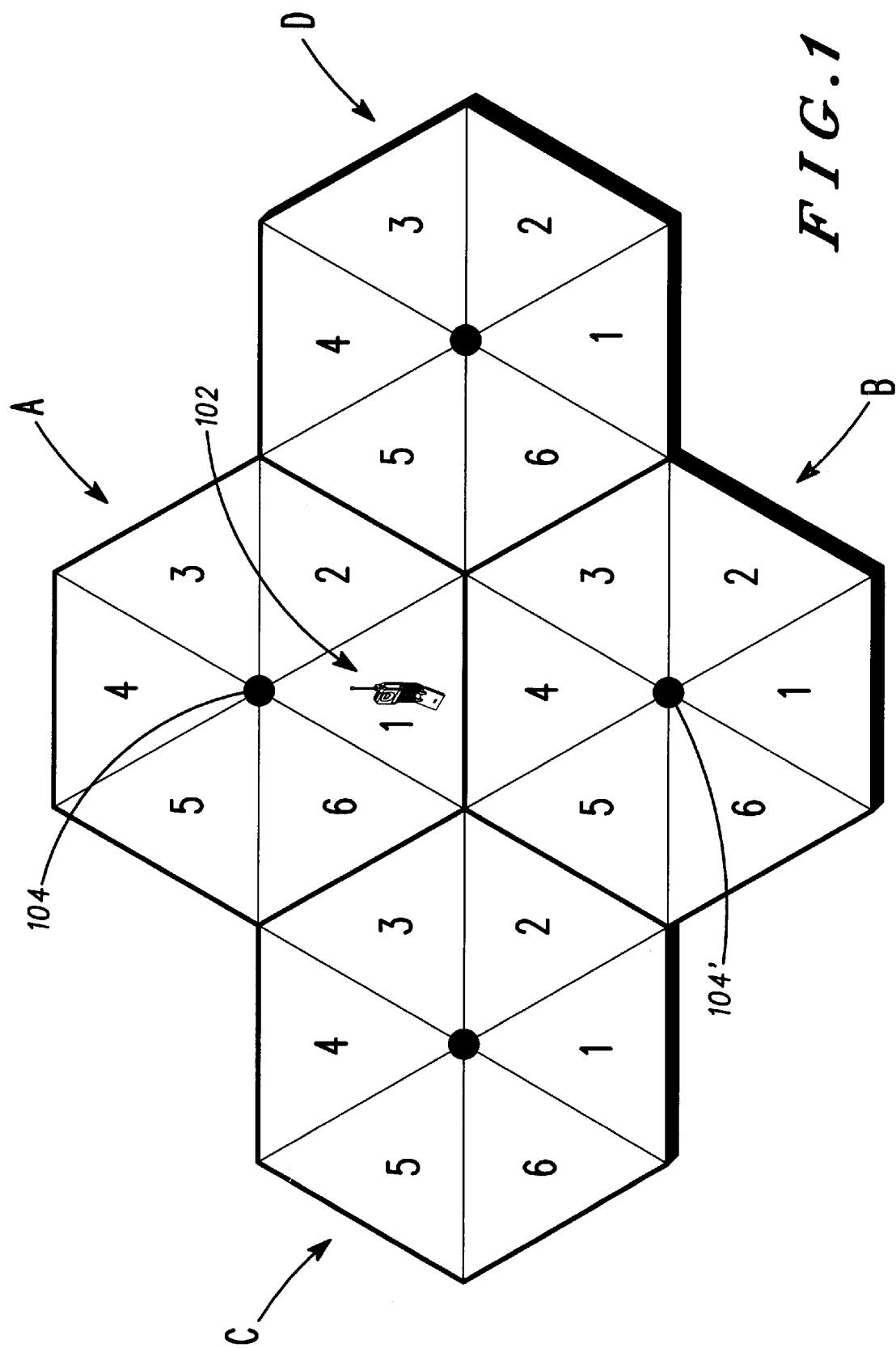
FIG. 1 is a schematic representation of a multiple cell system.
Figure 2:
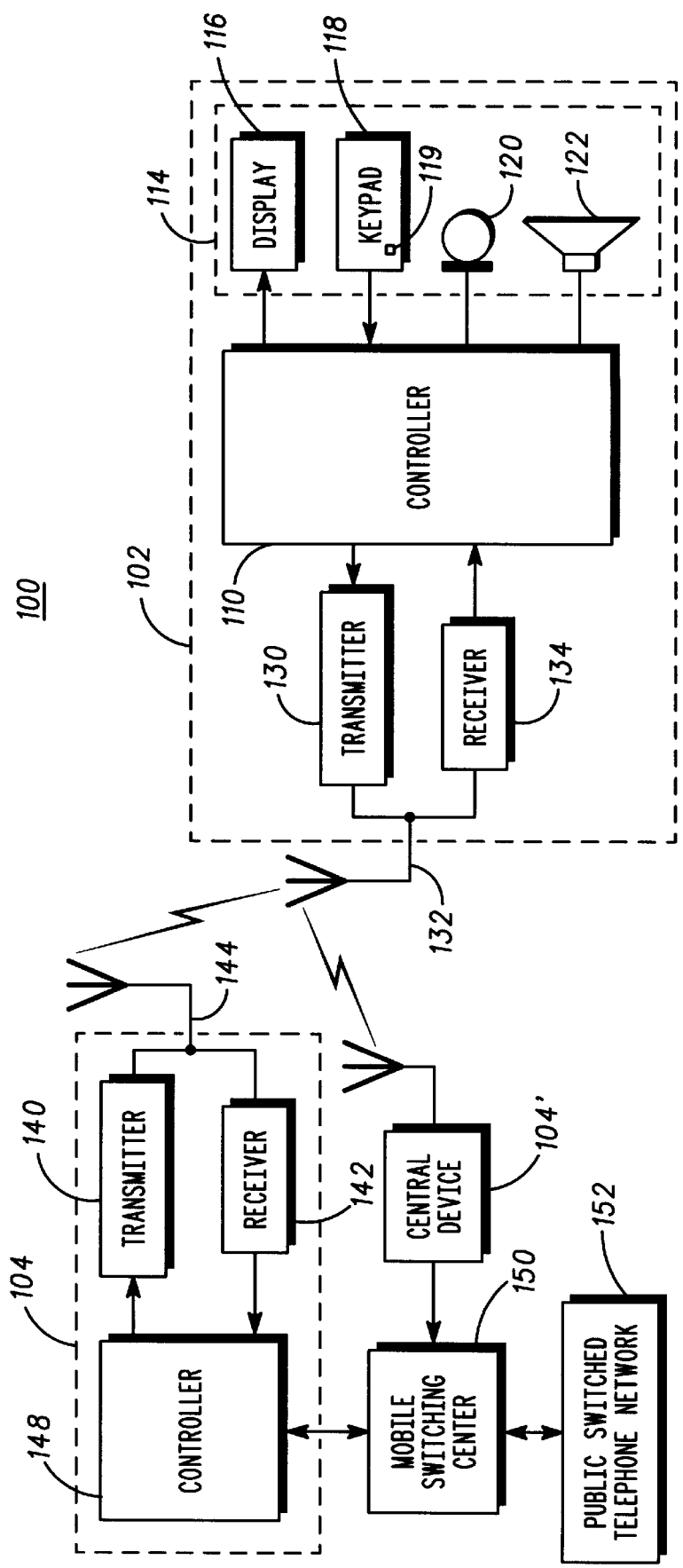
FIG. 2 is a circuit schematic in block diagram form illustrating a bi-directional radio frequency communication system.

With reference initially to FIG. 1, the illustrated radiotelephone system 100 includes cells A, B, C, and D. Each cell is a coverage area for a respective central device, such as 104 or 104', located therein. The illustrated cells A–D each includes sectors 1–6. A sector is a coverage area of one antenna in a multiple antenna array. Thus, the illustrated cells represent central devices each having a six antenna array. Each antenna covers an area within an angle of approximately 60 degrees. However, those skilled in the art will recognize that the cells can employ any number of antennas, such as a three antenna array wherein each antenna covers an area within an angle of approximately 120 degrees. Generally, a radiotelephone 102 located in sector 1 of cell A communicates with central device 104.

The radiotelephone 102 (FIG. 2) includes a controller 110 connected to a user interface 114. The user interface 114 includes a display 116 and a key input 118. The radiotelephone 102 can be a cordless telephone, portable cellular phone, a mobile cellular phone, a satellite phone, or any other bidirectional communication device using a wireless link to communicate with a central device, and "radiotelephone" as used herein refers to each of these and their equivalents. The key input is implemented using any suitable means, such as a push-button keypad, a dedicated key, a touch screen, or the like. The display 116 is implemented using a suitable commercially available apparatus, such as liquid crystal display (LCD), a light emitting diode (LED) display, or the like. The controller 110 is implemented using one or more suitable microcontrollers, digital signal processors, or microprocessors, such as a Motorola HC-11 microprocessor. The user interface also includes a microphone 120 and a speaker 122 connected to controller 110.

A radiotelephone 102 transceiver includes a transmitter 130 and a receiver 134. The controller 110 outputs signals to a transmitter 130, which modulates the signals for transmission via antenna 132. The signals output to the transmitter include control signals, signals detected by microphone 120, or any other signal for communication to central device 104. Signals detected by antenna 132 are demodulated by receiver 134, and the resulting signal is input to controller 110. Controller 110 outputs these signals to the speaker 122 or uses this signal in its control processes.

The central device 104 (FIG. 2) includes a transceiver comprising a transmitter 140 and a receiver 142 connected to an antenna 144. Antenna 144 is a single antenna of a multiple antenna array. The central device includes other antennas and transceivers which are not shown. A controller 148 receives demodulated signals output by receiver 142 and inputs signals to transmitter 140, which modulates the signals for transmission through antenna 144. The controller is coupled to a mobile switching center 150, which connects to a public switched telephone network 152 and another central device(s) 104'. The central device 104 can be a satellite, a base, a base station such as a cellular base station or an antenna subsystem comprising an antenna and an associated transceiver, or any other wireless communication device that communicates with a radiotelephone over one of a plurality of different channels, and as used herein, "central device" refers to each of these or their equivalents.

In existing cellular systems, the controller 148 evaluates the signal quality of the receive path, which is the frequency bandwidth for signals received by receiver 142. Channel selection is based in part on this received signal quality. However, the signals received by the central device 104 do not always reflect the quality of the signal received by the radiotelephone 102, as the receive and transmit paths are at different frequencies. For example, noise at the radiotelephone 102 may not be within the frequency band of both the transmit path and the receive path. Additionally, signal degradation can be caused by a nearby central device operating at or near the frequency of the radiotelephone 102 receive path. Another noise source unique to signals received by radiotelephone 102 is spurious response of the receiver circuitry in receiver 134 at certain frequencies. Those skilled in the art will recognize that there are numerous other phenomena that interfere with the cellular phone receive channel but do not show up in the central device 104 receive signal strength measurements.

To overcome these difficulties, the radiotelephone 102 includes a channel change initiation key 119. The subscriber manually actuates key 119 to initiate a channel change request. Although the preferred embodiment includes a dedicated key 119, it is also envisioned that the channel change can be initiated using an option menu displayed on display 116, a key of a standard telephone keyset, or a touch screen display, such that an additional dedicated key is not required.

Figure 3:
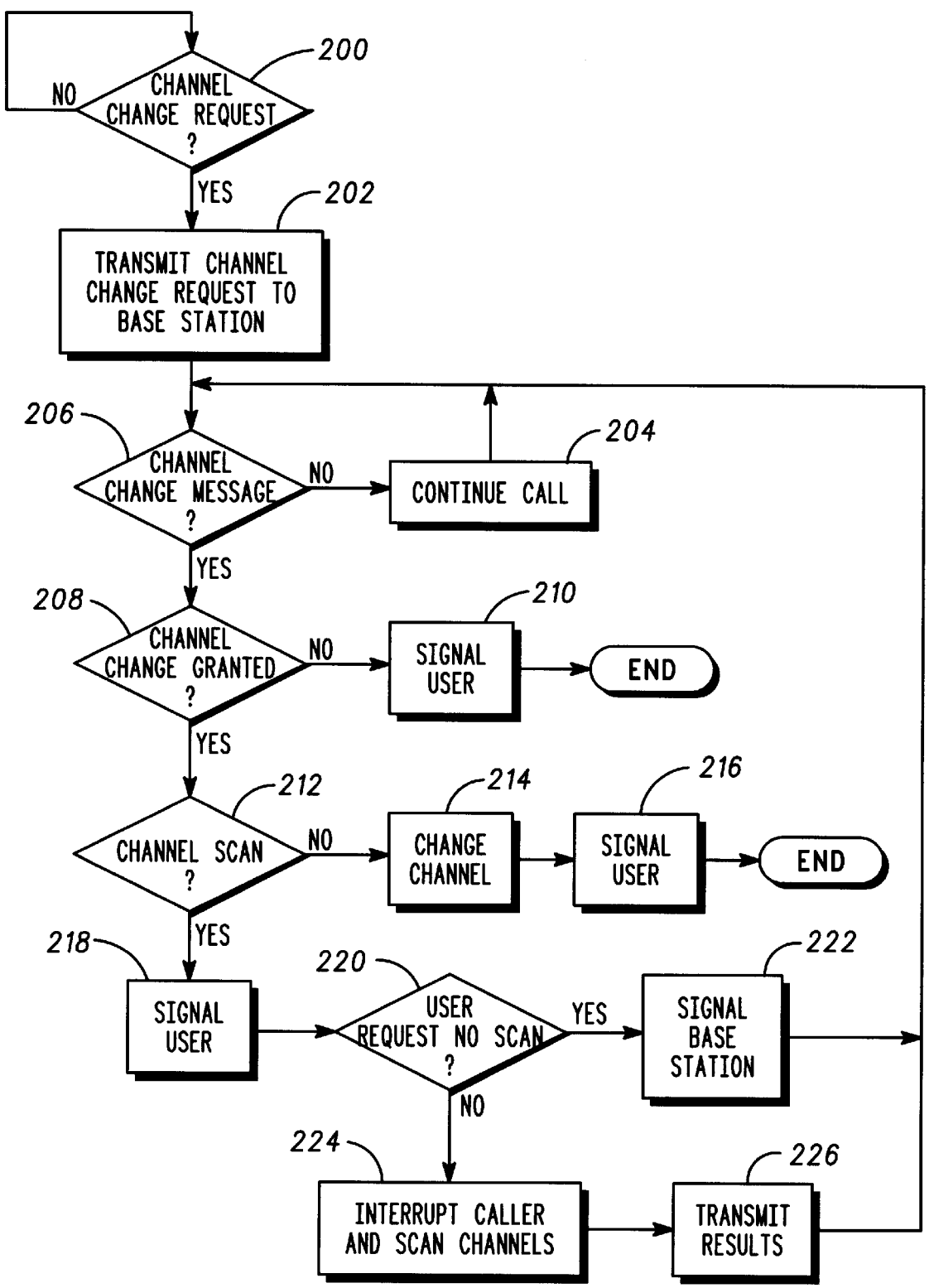
FIG. 3 is a flow chart illustrating a channel change request in a radiotelephone.

The controller 110 (FIG. 2) of the radiotelephone 102 is responsive to the channel change initiation key 119, detected in block 200, to initiate a channel change interrupt subroutine, represented in FIG. 3. When the channel change request is received, the controller 110 controls the transmitter 130 to transmit the channel change request to the central device 104, via the communication link, as indicated in block 202. The radiotelephone 102 controller 110 will then continue with call processing, as indicated in block 204, until a response is received from the central device 104, as indicated by block 206. The radiotelephone 102 will determine whether the response signal from central device 104 is a channel change denied signal, in decision block 208. If it is a channel change denied signal, the display 116 and/or speaker 122 is controlled to generate a signal which confirms to the user that a channel change is not available, as indicated in block 210. If the radiotelephone does not include a display, an audio signal having a particular tone, or audio pattern, is generated by speaker 122 to inform the user that the channel change has not be granted.

If the central device 104 response to the radiotelephone 102 channel change request is not a channel change denied signal, the controller 110 determines if there is a request for a channel scan from the central device 104, as indicated in block 212. If there is no request for a channel scan, the radiotelephone will change channels to the channel identified by the central device 104, as indicated in block 214. The user will be notified that the request has been granted by an audible tone or a message displayed on display 116, as indicated in block 216. The controller 110 will then exit the interrupt subroutine.

It will be recognized by those skilled in the art that the channel change can be implemented without notifying the user of whether the change was granted or denied. This has the advantage of making the channel change procedure transparent to the user and requires less processor resources. However, for those users of radiotelephone 102 that like to receive some type of feedback, such notification is desirable.

If the response is a channel scan instruction, as determined by controller 110 at decision block 212, the user will be notified by a tone and/or a message on display 116, as indicated in block 218. The user may then use the key input 118 to request that the scan be canceled, as indicated in block 220. This option is desirable as the active call will be interrupted during the radiotelephone channel scan in analog cellular systems. If the user requests no channel scan, as detected in decision block 220 within a predetermined time period, such as 5 seconds, the radiotelephone 102 transmits a signal to the central device 104 indicating that the user denied the scan, as indicated in block 222. The controller 148 then returns to block 206 until a channel change message is received from the central device 104, and continues the call. If the user does not prevent the scan using the key input 118, as determined in block 220, the controller 110 interrupts the call and scans the channels to measure the RSSI on incoming paths to the radiotelephone 102, as indicated at block 224. The results of the channel scan by the radiotelephone 102 are transmitted to the central device 104, as indicated in block 226. The controller 110 then returns to blocks 206 and 204 to continue the call until such time as a channel change message is received.

It is envisioned that the controller 110 (FIG. 2) can use display 116 to ask the user to accept the radiotelephone scan. For example, the controller 110 may control the display to generate a message "Interrupt call for channel scan? Y or N?" The user would use the key input 118 to accept the scan by entering Y, or refuse the scan by entering N. This allows the user to accept the scan, or not accept the scan, before an active call is interrupted.

The central device 104 preferably supplies a list of channels to the radiotelephone 102 in block 224 (FIG. 3). This list of channels will be other channels in the same sector as radiotelephone 102 that are presently active. An active channel is one on which a communication link with a remote device is established. The radiotelephone 102 controller 110 determines the RSSI level in each of these channels. The channel having the highest RSSI level is detected to be the best channel, and its identity is transmitted back to the central device 104 transmitter 130, in block 226. In this manner, the handset can determine which channels perform best for the particular radiotelephone where it is presently located. The signal measurements are taken without communicating signals from microphone 120 or to the speaker 122. Thus, the receive and transmit signals of the radiotelephone 102 are muted to prevent interference with, or monitoring of, the other active calls while the other active channels are measured.

Alternatively, the list of signal channels transmitted by the central device 104 can be a list inactive channels available to the central device 104. The central device 104 controller 148 controls the transmitter 140 to transmit carrier signals on each of the inactive channels. The radiotelephone can then scan these channels to identify channels having a signal strength measurement above a predetermined minimum level. The minimum level can be set to 10 to 20 dB above the noise floor. The noise floor is the expected level of noise in a non-active channel. For example, where the noise floor is −115 dB, the threshold can be −105 dB. When the RSSI measurement for a channel is above −105 dB, such as being measured to be −90 dB, that channel can be selected. The actual threshold level may be set at any value desired. The radiotelephone 102 controller 110 can then identify the best channel, which is the channel having the highest measurement that is above the minimum threshold, and transmit that channel number to the central device 104, in block 226.

Although it is envisioned that the blocks 200–216 can be implemented without channel scan blocks 218–224, conducting the channel scan has the significant advantage of providing the central device with information about the channels from the central device 104 to the radiotelephone 102. This provides the central device with specific information about the performance of the radiotelephone 102 where it is presently located. This is particularly important with cellular radiotelephones because of there great mobility.

Figure 4:
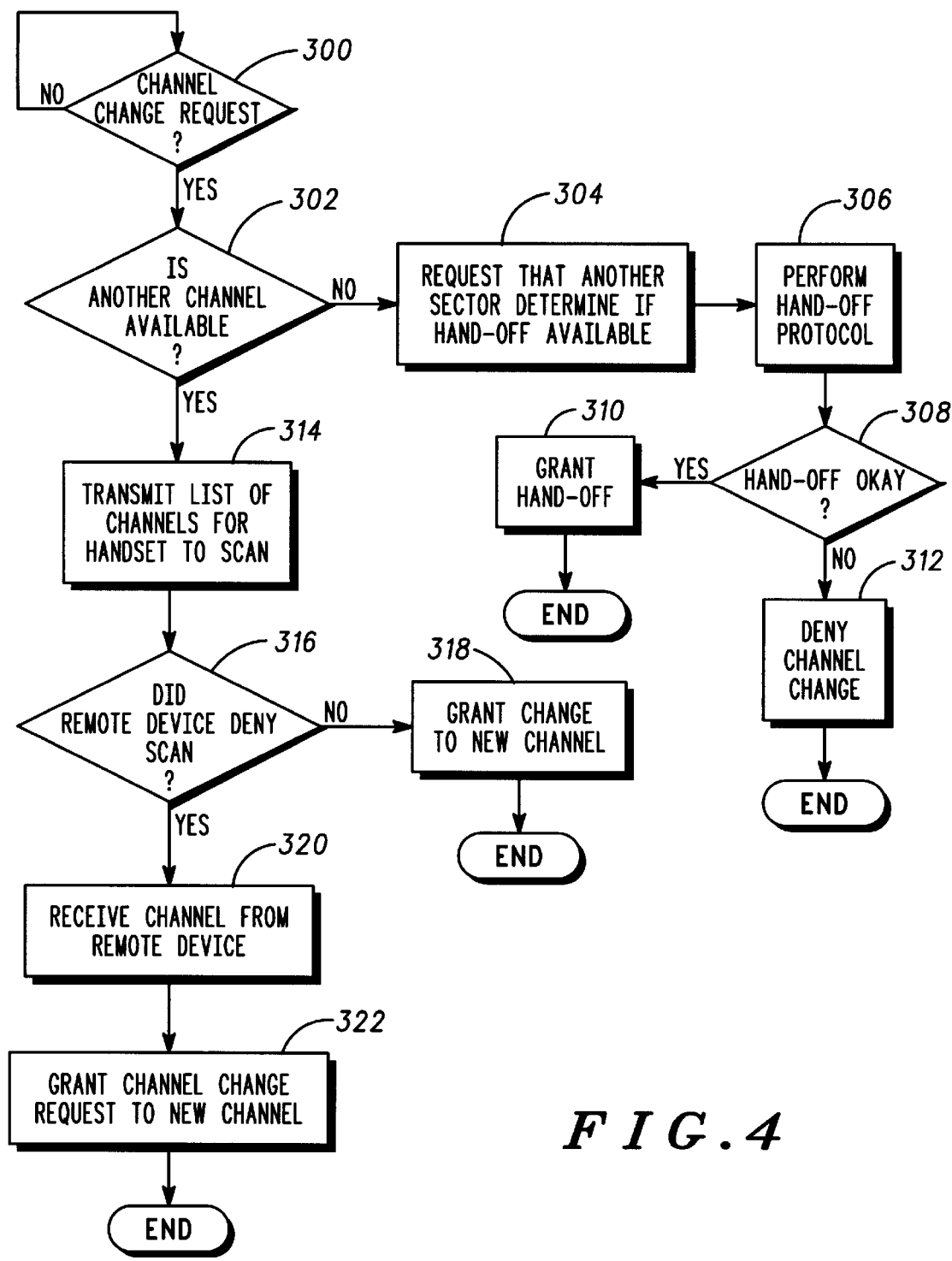
FIG. 4 is a flow chart illustrating a channel change response in a central device.

The central device 104 responds to the channel change request to conduct a channel change reply subroutine shown in FIG. 4. The controller 148 (FIG. 2) waits for a channel change request, as indicated in block 300, to start this subroutine. When a channel change request is received from the radiotelephone 102, the controller 148 determines whether another channel is available in the same sector 1 (FIG. 1) of cell A, as indicated in block 302. The controller 148 knows which channels are currently being used for an active call.

If another channel is not available in the same sector, meaning all other channels in that sector are being used, the controller 148 requests that the availability of a channel in another sector be evaluated, as indicated in block 304. Examples of other sectors that might be evaluated if the radiotelephone 102 is in sector 1 of cell A (FIG. 1) include sectors 2 and 6 of cell A, sector 4 of cell B and sectors 5 and 6 of cell D. A handoff protocol, or procedure, will be executed, as indicated in block 306. If another channel is available with another sector, such as another antenna in central device 104 or another central device 104', as determined in decision block 308, the controller 148 grants handoff to the other sector antenna identified, as indicated in block 310. This accomplishes an inter sector handoff within the same cell or inter base station handoff to another base station, and the interrupt subroutine ends. The inter sector handoff and/or inter base station handoff can use the handoff criteria employed in existing handoff protocols for cellular systems. If no other sector device, meaning a sector antenna and associated transmitter and receiver, or the like, is available having a channel to the radiotelephone 102, the controller 148 controls the transmitter 140 to signal the radiotelephone 102 that the channel change is denied, as indicated in block 312, and the subroutine ends.

In this manner a central device 104 can selectively handoff the radiotelephone 102 to another sector, or another central device, having better channel quality when the user perceives that signal quality with the existing central device 104 is not satisfactory. It is envisioned that the inter sector handoff can be omitted to reduce processor complexity. However, the user initiated inter sector, or inter central device, handoff is preferably provided as it permits handoff initiation based upon user perceived signal degradation in the transmit channel, if the central device does not detect the degradation in the receive channel or if the central device does not recognize the poor channel quality, even if additional channels are not available in the same sector.

If it was determined in block 302 that the central device 104 has at least one other channel available for communicating with the radiotelephone 102, the controller 148 controls transmitter 140 to transmit a signal to radiotelephone 102 requesting that the radiotelephone conduct a channel scan, as indicated in block 314. This signal can include a list of certain channels to scan. The list of channels comprises those channels in the same sector as the radiotelephone 102 that have an active call or a list of channels upon which the central device will generate a carrier signal. If the radiotelephone 102 responds to the scan request by denying radiotelephone channel scanning, as detected at decision block 316, the controller 148 will proceed to block 318. In block 318 controller 148 controls transmitter 140 to send a signal instructing the radiotelephone 102 to change to a new channel. The new channel can be the channel sequentially closest to the channel that the radiotelephone 102 was using when the channel change request was made. The new channel can alternately be a channel having a frequency substantially different from the frequency of the channel that the radiotelephone was using. By picking a new channel with a frequency much different from the previous channel, instead of automatically selecting the next sequential channel, frequency sensitive characteristics of the radiotelephone receiver, or the interfering noise, that induced the user to request a channel change, is less likely to detrimentally affect the new channel. Following the channel change grant, the subroutine ends.

If a channel scan is conducted by the radiotelephone 102 following the channel scan request, the central device 104 waits to receive a channel from the radiotelephone, as indicated in block 320. The channel received will be the channel identified by the radiotelephone as having the best quality, which may for example be the highest RSSI level. The central device controller 148 will then select a new channel. This new channel will be the available, or inactive, channel (i.e., a channel not in use) that is closest to the channel identified by the radiotelephone. If the channel change request is due to frequency characteristics of the radiotelephone circuitry, or interfering noise at a particular frequency, the channel closest to the best channel identified by the radiotelephone during the scan will likely be the best channel to avoid these problems. Alternatively, if the list sent to the radiotelephone is includes inactive channels, such that the central device is broadcasting a carrier wave in such inactive channels, the channel identified by the radiotelephone is the carrier signal, whereby the radiotelephone selects the new channel. In either case, the new channel is communicated to the radiotelephone 102 via transmitter 140, as indicated in block 322, thereby granting and confirming the channel change request. The subroutine will then end.

Thus it can be seen that an improved system is disclosed wherein a subscriber initiates a channel change. The present system allows a user to initiate a channel change when the user perceives transmit channel signal quality is not adequate. This is an improvement over prior cellular systems, wherein the user had to hang-up and call again, or put up with the noisy signal channel. The present invention is particularly advantageous when the receive channel to the central site from the radiotelephone is adequate, even though the transmit channel to the radiotelephone to the central device is inadequate. For example, the invention is advantageous in cellular devices where an interfering signal or cross-talk causes the sound quality received by a mobile subscriber terminal to degrade or become unintelligible, while the sound quality of the signal received by the central device is not degraded.

What is claimed is:

1. A method of operating a radiotelephone to perform an on demand channel change in a cellular system including at least one central device, the radiotelephone including a transceiver, a manually actuated user input and a controller, the method comprising the steps of:

generating a channel change request responsive to actuation of the manually actuated user input during an active call;

controlling the transceiver to transmit a channel change request to the central device responsive to the channel change request;

changing to a new channel identified by the central device if a first reply signal is received from the central device;

controlling the user interface to generate a display signal for a user confirming that a channel change is not available if a second reply signal is received from the central device; and performing a channel scan if a channel scan request signal is received from the central device, wherein the step of performing a channel scan includes scanning a list of channels received from the central device and said step of scanning includes scanning those channels in the list.

* * * * *